US012522133B2

(12) United States Patent
Kaneta et al.

(10) Patent No.: US 12,522,133 B2
(45) Date of Patent: Jan. 13, 2026

(54) OCCUPANT PROTECTION APPARATUS

(71) Applicant: SUBARU CORPORATION, Tokyo (JP)

(72) Inventors: Takuya Kaneta, Tokyo (JP); Chooi Chuan Sim, Tokyo (JP); Yuta Goto, Tokyo (JP); Iyo Hashimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 221 days.

(21) Appl. No.: 18/371,928

(22) Filed: Sep. 22, 2023

(65) Prior Publication Data
US 2024/0109481 A1   Apr. 4, 2024

(30) Foreign Application Priority Data

Oct. 4, 2022  (JP) ................... 2022-160064

(51) Int. Cl.
*B60Q 1/50* (2006.01)
*B60L 3/00* (2019.01)
*G08B 21/18* (2006.01)

(52) U.S. Cl.
CPC ............. *B60Q 1/544* (2022.05); *G08B 21/18* (2013.01); *B60L 3/00* (2013.01)

(58) Field of Classification Search
CPC ............ B60Q 1/544; G08B 21/18; B60L 3/00
USPC ....................................................... 701/22
See application file for complete search history.

(56) References Cited

U.S. PATENT DOCUMENTS

| | | | |
|---|---|---|---|
| 9,153,135 B2* | 10/2015 | Bantz | G08G 1/16 |
| 10,403,113 B1* | 9/2019 | Antar | G01V 3/081 |
| 2008/0135321 A1* | 6/2008 | Ripple | A61G 5/043 |
| | | | 180/282 |
| 2017/0270252 A1* | 9/2017 | Feit | G16H 10/60 |
| 2018/0348759 A1* | 12/2018 | Freeman | A61N 1/3904 |
| 2019/0039466 A1* | 2/2019 | Jung | B60L 53/12 |
| 2019/0054829 A1* | 2/2019 | Seong | A61N 1/37229 |
| 2021/0237594 A1* | 8/2021 | Prasad | H04N 7/181 |
| 2022/0272514 A1* | 8/2022 | Kwon | H04W 4/40 |
| 2022/0410731 A1* | 12/2022 | Yokoyama | H02J 7/0024 |

(Continued)

FOREIGN PATENT DOCUMENTS

JP   2016-149105 A   8/2016
WO   WO-2018122474 A1 *  7/2018  ........... B60K 28/066

*Primary Examiner* — Krishnan Ramesh
(74) *Attorney, Agent, or Firm* — TROUTMAN PEPPER LOCKE LLP (57) ABSTRACT

An occupant protection apparatus to be applied to a vehicle includes a contact sensor, an occupant detector, an electromagnetic wave sensor, a control processor, and a protection processor. The contact sensor detects contact of the vehicle. The occupant detector detects whether there is an occupant who is wearing a medical device in the vehicle when the contact sensor detects the contact of the vehicle. The electromagnetic wave sensor detects an electromagnetic wave. The control processor controls the vehicle to reduce the electromagnetic wave inside the vehicle based on a detection result of the electromagnetic wave sensor. The protection processor performs a protection process of protecting the occupant who is wearing the medical device, based on a detection result of the electromagnetic wave sensor after the control processor has controlled the vehicle.

9 Claims, 6 Drawing Sheets

(56) References Cited

U.S. PATENT DOCUMENTS

| | | | | |
|---|---|---|---|---|
| 2023/0150369 A1* | 5/2023 | Choi | ................ | B60L 58/14 |
| | | | | 701/16 |
| 2023/0311697 A1* | 10/2023 | Lu | ................ | H04W 4/021 |
| | | | | 701/22 |

* cited by examiner

OCCUPANT PROTECTION APPARATUS

CROSS-REFERENCE TO RELATED APPLICATION

The present application claims priority from Japanese Patent Application No. 2022-160064 filed on Oct. 4, 2022, the entire contents of which are hereby incorporated by reference.

BACKGROUND

The disclosure relates to an occupant protection apparatus that protects an occupant of a vehicle.

In vehicles, an occupant inside a vehicle is often detected. For example, Japanese Unexamined Patent Application Publication No. 2016-149105 discloses a system that determines whether an occupant inside a vehicle is in a risky situation and makes a notification to an outside of the vehicle if the occupant is in the risky situation.

SUMMARY

An aspect of the disclosure provides an occupant protection apparatus to be applied to a vehicle including a contact sensor, an occupant detector, an electromagnetic wave sensor, a control processor, and a protection processor. The contact sensor is configured to detect contact of the vehicle. The occupant detector is configured to detect whether there is an occupant who is wearing a medical device in the vehicle when the contact sensor detects the contact of the vehicle. The electromagnetic wave sensor is configured to detect an electromagnetic wave. The control processor is configured to control the vehicle to reduce the electromagnetic wave inside the vehicle based on a detection result of the electromagnetic wave sensor. The protection processor is configured to perform a protection process of protecting the occupant who is wearing the medical device, based on a detection result of the electromagnetic wave sensor after the control processor has controlled the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

A person who is wearing a medical device such as a pacemaker may get on a vehicle. It is desirable that the vehicle provide high safety for such an occupant, and further improvement of the safety is expected.

It is desirable to provide an occupant protection apparatus that makes it possible to improve safety of an occupant who is wearing a medical device.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 1:
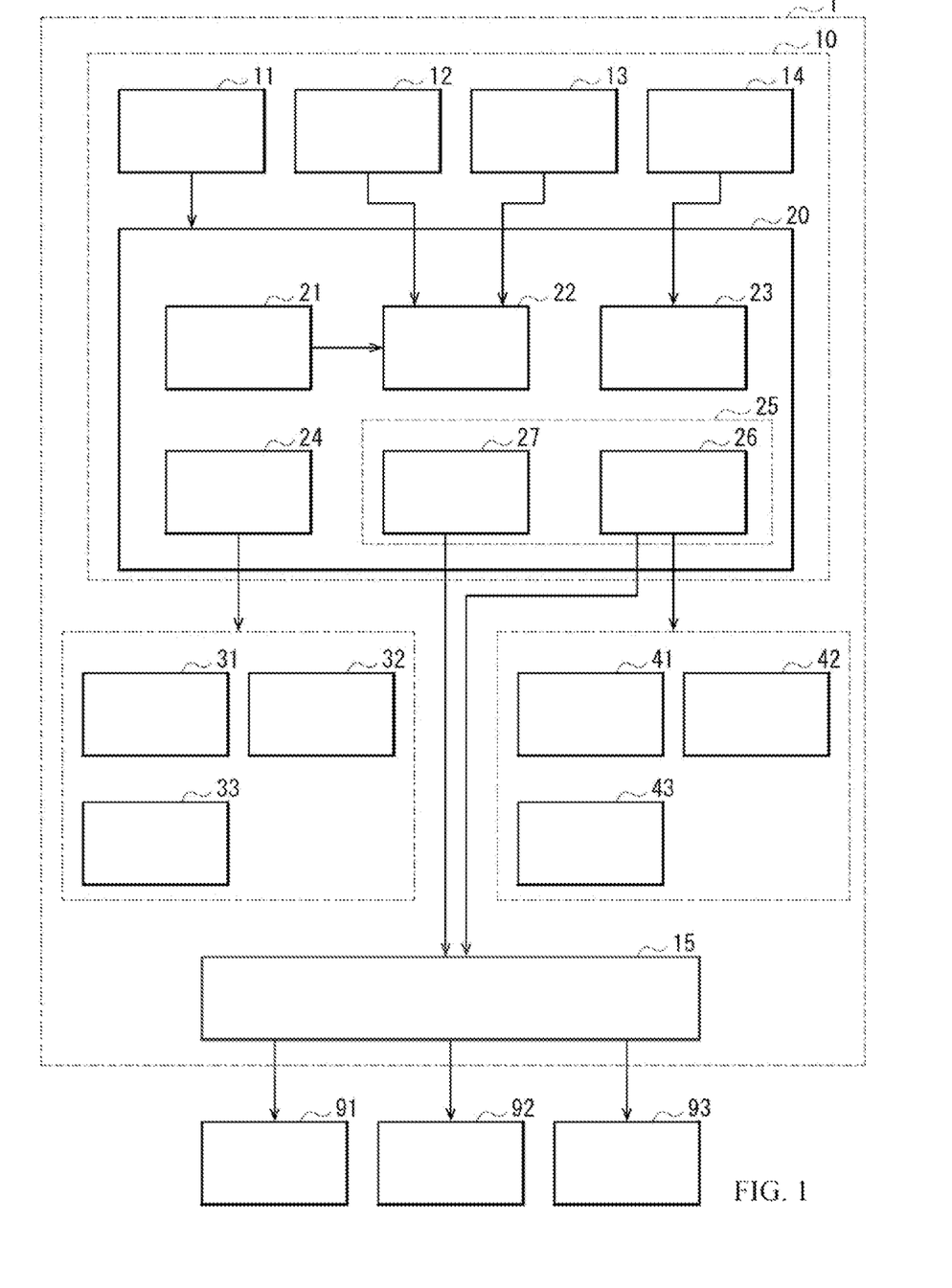
FIG. 1 is a block diagram illustrating an example configuration of an occupant protection apparatus according to one example embodiment of the disclosure.

FIG. 1 illustrates an example configuration of a vehicle 1 including an occupant protection apparatus 10 according to an example embodiment. In this example, the vehicle 1 may be an electric vehicle. Note that this example is a non-limiting example, and the vehicle 1 may be, for example, a gasoline-powered vehicle. The vehicle 1 may include the occupant protection apparatus 10, a motor 31, a battery 32, a smart key system 33, a lamp 41, a horn 42, a head-up display 43, and a communicator 15.

The occupant protection apparatus 10 may be configured to protect an occupant in the vehicle 1. The occupant protection apparatus 10 may include a contact sensor 11, a camera 12, an occupant position sensor 13, an electromagnetic wave sensor 14, and a processor 20.

The contact sensor 11 is configured to detect contact of the vehicle 1. For example, the contact sensor 11 may detect that the vehicle 1 has come into contact with an object by detecting, for example, an impact caused when the vehicle 1 comes into contact with various objects such as another vehicle or a structure.

The camera 12 may include an image sensor. The camera 12 may be configured to take images of an inside of the vehicle 1 to thereby take images of an occupant seated in any of the seats in the vehicle 1.

The occupant position sensor 13 may be provided for each of the seats of the vehicle 1 and configured to detect whether an occupant is seated in the corresponding seat.

The electromagnetic wave sensor 14 is configured to detect an electromagnetic wave. The electromagnetic wave sensor 14 may include, for example, multiple sensors disposed at various positions in the vehicle 1. The electromagnetic wave sensor 14 may detect intensity of an electromagnetic wave at the various positions. The vehicle 1 may include various components. Some of the components may generate an electromagnetic wave. In general, the electromagnetic wave is reduced to a certain level inside the vehicle 1 by placing the components at certain positions or providing an electromagnetic wave shield. However, for example, if the vehicle 1 comes into contact with an object, resulting in deformation of part of a body of the vehicle 1, the components can be displaced, or the shield can be damaged. This can possibly increase the intensity of the electromagnetic wave inside the vehicle 1. Furthermore, for example, if the vehicle 1 comes into contact with an apparatus outside the vehicle 1, the apparatus can generate an electromagnetic wave. In the vehicle 1, the electromagnetic wave sensor 14 may detect an electromagnetic wave in a case such as the one described above.

The processor 20 may be configured to perform various protection processes for protecting an occupant based on detection results of the contact sensor 11, the camera 12, the occupant position sensor 13, and the electromagnetic wave sensor 14. The processor 20 may include, for example, one or more processors and one or more memories. The processor 20 may include an occupant data generating unit 21, an occupant detecting unit 22, an electromagnetic wave detecting unit 23, a source controlling unit 24, and a protection processing unit 25.

The occupant data generating unit 21 may be configured to generate data (occupant data) on an occupant of the vehicle 1 and to store the generated occupant data. The occupant data may include, for example, data adapted for face recognition of the occupant and data indicating whether the occupant is wearing a medical device such as a pacemaker for the occupant or each of occupants on the vehicle 1.

The occupant detecting unit 22 may be configured to detect an occupant or occupants in any one or more of the seats of the vehicle 1 based on the images taken by the camera 12 and the detection result of the occupant position sensor 13. The occupant detecting unit 22 may determine the position of the occupant who is wearing a medical device such as a pacemaker based on the occupant data supplied from the occupant data generating unit 21.

The electromagnetic wave detecting unit 23 may be configured to determine the position of a source of the electromagnetic wave based on the detection result of the electromagnetic wave sensor 14. For example, the electromagnetic wave detecting unit 23 may determine the position of the source of the electromagnetic wave based on the intensity of the electromagnetic wave detected by the sensors included in the electromagnetic wave sensor 14 and disposed at various positions.

The source controlling unit 24 may be configured to control operation of a component of the vehicle 1 that is the source of the electromagnetic wave based on a detection result of the occupant detecting unit 22 and a detection result of the electromagnetic wave detecting unit 23. In this example, the vehicle 1 may be an electric vehicle, and the source of the electromagnetic wave may be the motor 31, the battery 32, and the smart key system 33. Note that the source of the electromagnetic wave is not limited to those described above and may further include other various components. The source controlling unit 24 may have, for example, information on the positions of the above components in a design phase of the vehicle 1. Based on the position indicated by the detection result of the electromagnetic wave detecting unit 23 and the intensity of the electromagnetic wave, the source controlling unit 24 may determine which of the various components is the source of the electromagnetic wave at that position. Thereafter, the source controlling unit 24 may control the operation of the component to reduce or stop output of the electromagnetic wave.

The protection processing unit 25 is configured to perform various protection processes adapted to protect the occupant if, for example, the vehicle 1 comes into contact with an object. The protection processing unit 25 may include a notification controlling unit 26 and an external device controlling unit 27.

The notification controlling unit 26 may be configured to perform notification control in which people around the vehicle 1 are notified of information if the vehicle 1 comes into contact with an object. For example, the notification controlling unit 26 may control the operation of the communicator 15 to cause the communicator 15 to make an emergency notification to an emergency notification server 91. Furthermore, the notification controlling unit 26 may control the operation of the lamp 41 or the horn 42 to cause the lamp 41 to emit light or the horn 42 to emit a sound. In this manner, the vehicle 1 may notify people around the vehicle 1 that there is an occupant to be rescued inside the vehicle 1. Furthermore, the notification controlling unit 26 may control the operation of the head-up display 43 to cause the head-up display 43 to display a message indicating that there is an occupant to be rescued inside the vehicle 1 on a front windshield, a rear window, a side window, etc. of the vehicle 1 in such a manner that the message is visible from an outside of the vehicle 1. Furthermore, the notification controlling unit 26 may control the operation of the communicator 15 to cause the communicator 15 to transmit a message indicating that there is an occupant to be rescued inside the vehicle 1 to a vehicle 92 around the vehicle 1 or a portable terminal 93 held by a person around the vehicle 1.

The external device controlling unit 27 may be configured to control the operation of an external device around the vehicle 1 if the vehicle 1 comes into contact with an object. For example, the external device controlling unit 27 may control the operation of the communicator 15 to cause the communicator 15 to transmit a control signal to the vehicle 92 around the vehicle 1 or the portable terminal 93 of a person around the vehicle 1. The control signal may cause the output of the electromagnetic wave to be reduced or stopped.

The motor 31 may be configured to generate a driving force of the vehicle 1. The battery 32 may be configured to store electric power to be supplied to the motor 31. The smart key system 33 may be configured to lock or unlock doors of the vehicle 1 through, for example, communication with a smart key held by a driver who drives the vehicle 1. The motor 31, the battery 32, and the smart key system 33 may be components that generate an electromagnetic wave. Note that the components that generate an electromagnetic wave are not limited to those described above. Various circuits including, for example, an inverter may generate an electromagnetic wave. It is possible to control the operation of these components by the source controlling unit 24 if, for example, the vehicle 1 comes into contact with an object.

The lamp 41 may be, for example, a headlamp, a tail lamp, and a turn signal lamp of the vehicle 1. The lamp 41 may be configured to emit light to illuminate the surroundings or to notify people around the vehicle 1 of an intention of the driver who drives the vehicle 1. The horn 42 may be configured to emit a sound to notify people around the vehicle 1 of the intention of the driver who drives the vehicle 1. The head-up display 43 may be configured to display information about the vehicle 1 on the front windshield, the rear window, the side window, etc. of the vehicle 1. This makes it possible for the occupant of the vehicle 1 to obtain information such as a traveling state of the vehicle 1. The lamp 41, the horn 42, and the head-up display 43 may make a notification of the information as described above. The lamp 41, the horn 42, and the head-up display 43 may be controlled by the notification controlling unit 26 if, for example, the vehicle 1 comes into contact with an object. The lamp 41 may emit light if the vehicle 1 comes into contact with an object. This makes it possible to notify people around the vehicle 1 that there is an occupant to be rescued inside the vehicle 1. The horn 42 may emit a sound if the vehicle 1 comes into contact with an object. This makes it possible to notify people around the vehicle 1 that there is an occupant to be rescued inside the vehicle 1. Furthermore, if the vehicle 1 comes into contact with an object, the head-up display 43 may display a message indicating that there is an occupant to be rescued inside the vehicle 1 in such a manner that the message is visible from the outside of the vehicle 1. This makes it possible to notify people around the vehicle 1 of the fact.

The communicator 15 may be configured to communicate with the outside of the vehicle 1. The communicator 15 may communicate with the outside of the vehicle 1 using, for example, a cellular network (mobile communications), vehicle-to-vehicle communication, or Bluetooth (registered trademark). In this example, the communicator 15 may communicate with the emergency notification server 91 using the cellular network. The emergency notification server 91 may receive an emergency notification from the vehicle 1 in case of an emergency such as an unexpected event of the vehicle 1. The emergency notification server 91 may make a notification to, for example, a police or a fire department based on the emergency notification. Furthermore, the communicator 15 may communicate with the vehicle 92 around the vehicle 1 using the vehicle-to-vehicle communication. The communicator 15 may communicate with the portable terminal 93 such as a smartphone held by a person around the vehicle 1 using Bluetooth (registered trademark).

In one embodiment, the contact sensor 11 may serve as a "contact sensor". In one embodiment, the occupant detecting unit 22 may serve as an "occupant detector". In one embodiment, the electromagnetic wave sensor 14 may serve as an "electromagnetic wave sensor". In one embodiment, the source controlling unit 24 may serve as a "control processor". In one embodiment, the protection processing unit 25 may serve as a "protection processor". In one embodiment, the communicator 15 may serve as a "communicator". In one embodiment, the lamp 41, the horn 42, and the head-up display 43 may each serve as a "notifier".

An operation and workings of the occupant protection apparatus 10 according to the example embodiment will now be described.

First, an operation of the occupant protection apparatus 10 will be described with reference to FIG. 1. The contact sensor 11 detects contact of the vehicle 1. The camera 12 may take images of the inside of the vehicle 1 to thereby take images of an occupant or occupants seated in any one or more of the seats in the vehicle 1. The occupant position sensor 13 may detect whether an occupant is seated in the corresponding seat in the vehicle 1. The electromagnetic wave sensor 14 detects an electromagnetic wave. The processor 20 may perform various protection processes for protecting the occupant based on the detection results of the contact sensor 11, the camera 12, the occupant position sensor 13, and the electromagnetic wave sensor 14. For example, the occupant data generating unit 21 in the processor 20 may generate data (occupant data) on the occupant of the vehicle 1 and store the generated occupant data. The occupant detecting unit 22 may detect an occupant or occupants in any one or more of the seats of the vehicle 1 based on the images taken by the camera 12 and the detection result of the occupant position sensor 13. The occupant detecting unit 22 may determine the position of the occupant who is wearing a medical device such as a pacemaker based on the occupant data supplied from the occupant data generating unit 21. The electromagnetic wave detecting unit 23 may determine the position of the source of the electromagnetic wave based on the detection result of the electromagnetic wave sensor 14. The source controlling unit 24 may control operation of the component of the vehicle 1 that is the source of the electromagnetic wave based on the detection result of the occupant detecting unit 22 and the detection result of the electromagnetic wave detecting unit 23. The notification controlling unit 26 in the protection processing unit 25 may perform notification control in which people around the vehicle 1 are notified of the information if the vehicle 1 comes into contact with an object. If the vehicle 1 comes into contact with an object, the external device controlling unit 27 in the protection processing unit 25 may control operation of the external device around the vehicle 1.

Figure 2A:
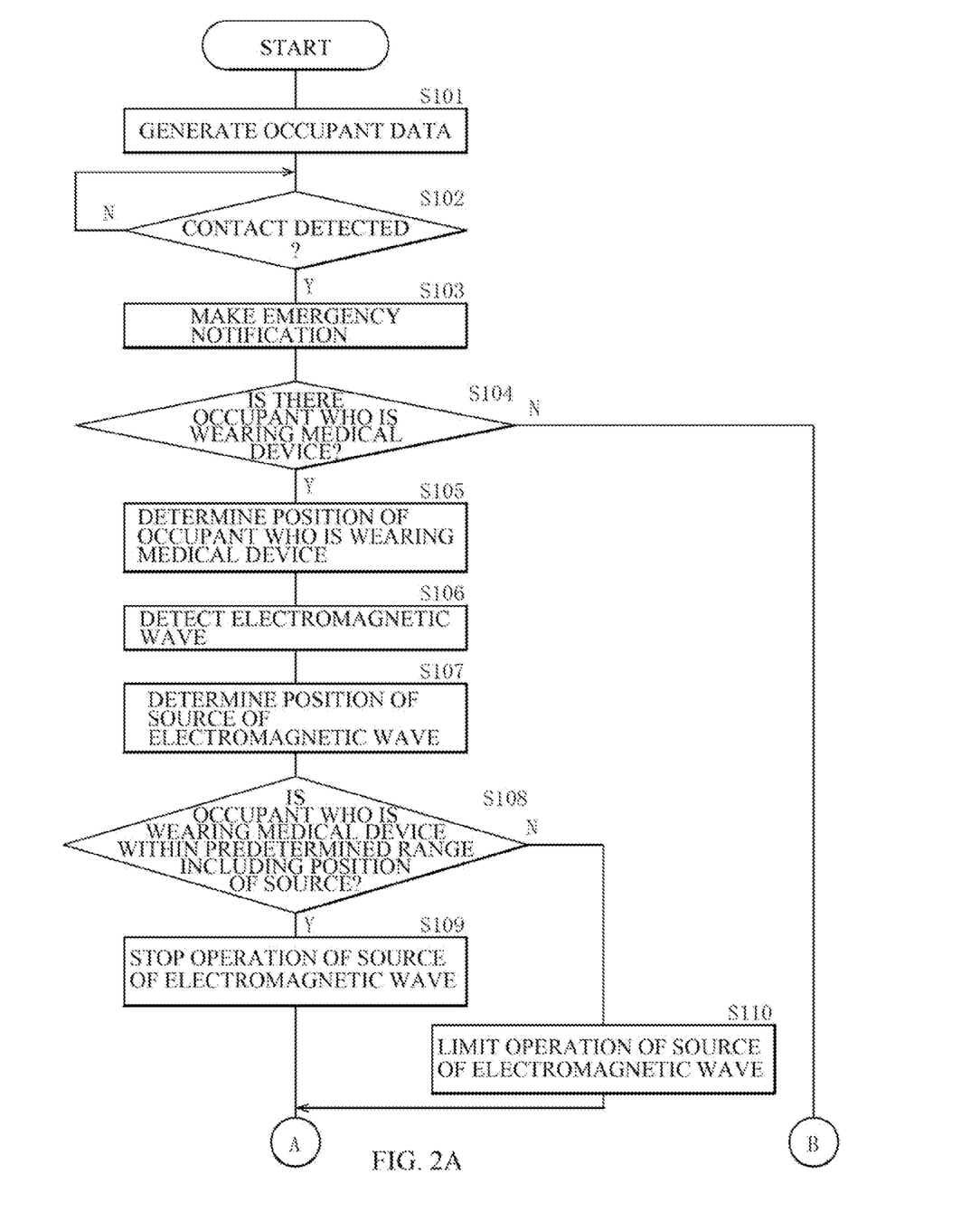
FIG. 2A is a flowchart illustrating an example operation of the occupant protection apparatus illustrated in FIG. 1.
Figure 2B:
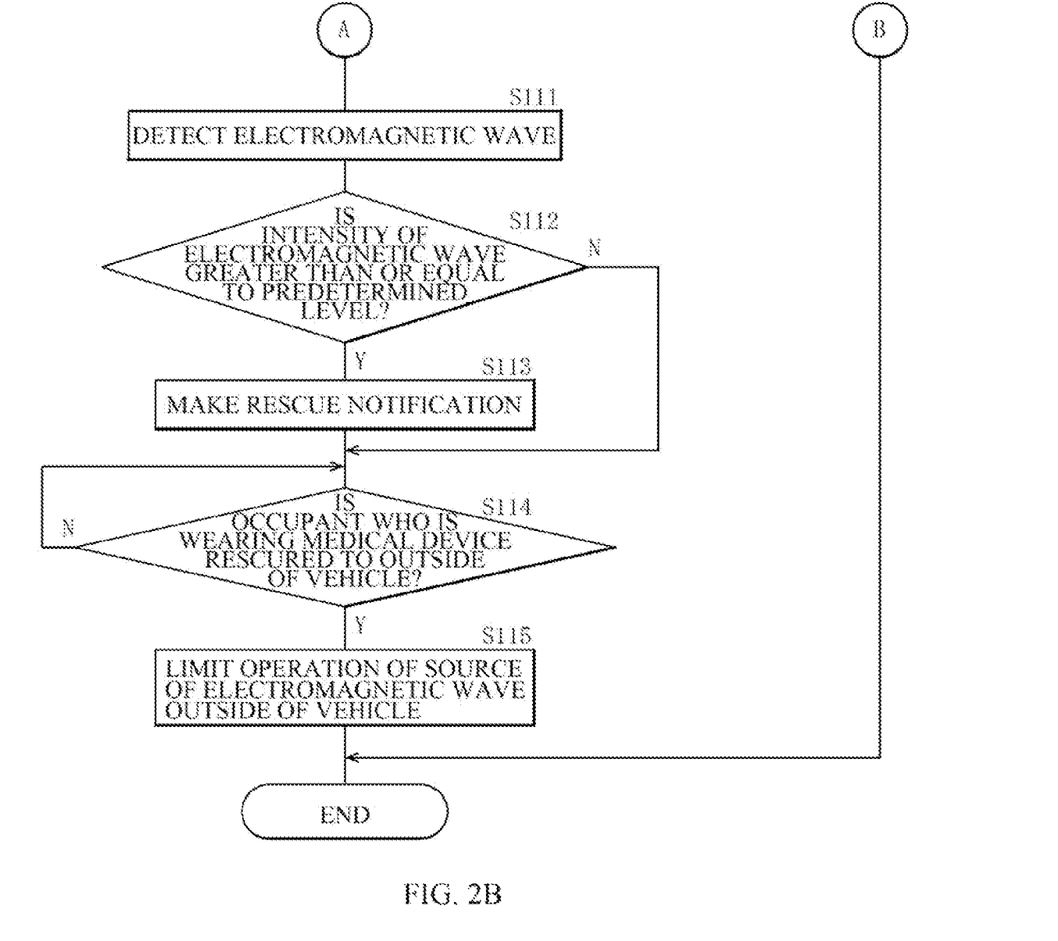
FIG. 2B is another flowchart illustrating the example operation of the occupant protection apparatus illustrated in FIG. 1.

FIGS. 2A and 2B illustrate an example operation of the occupant protection apparatus 10.

First, the occupant data generating unit 21 may generate the occupant data (step S101). For example, the occupant data generating unit 21 may generate the occupant data including data for performing face recognition of the occupant and data indicating whether the occupant is wearing a medical device such as a pacemaker for an occupant or each of occupants on the vehicle 1. The occupant data generating unit 21 may generate data for performing face recognition of the occupant based on the images taken by the camera 12 when, for example, the occupant gets on the vehicle 1. Alternatively, the occupant data generating unit 21 may generate data for performing face recognition of the occupant based on an image taken by a smartphone of the occupant. Furthermore, the occupant data generating unit 21 may generate data indicating whether the occupant is wearing a medical device based on input operation that the occupant has performed on a user interface on the vehicle 1 when, for example, the occupant gets on the vehicle 1. Alternatively, the occupant data generating unit 21 may generate data indicating whether the occupant is wearing a medical device based on input operation that the occupant has performed on the smartphone of the occupant. Thereafter, the occupant data generating unit 21 may store the generated occupant data.

Thereafter, the processor 20 may determine whether the contact sensor 11 has detected contact of the vehicle 1 (step S102). If the contact sensor 11 has not detected contact of the vehicle ("N" in step S102), the processor 20 may repeat the process of step S102 until the contact sensor 11 detects contact of the vehicle 1.

In step S102, if the contact sensor 11 has detected contact of the vehicle 1 ("Y" in step S102), the vehicle 1 may make an emergency notification (step S103). For example, the notification controlling unit 26 may control the operation of the communicator 15 to cause the communicator 15 to make an emergency notification to the emergency notification server 91. The emergency notification server 91 may make a notification to the police or the fire department based on the emergency notification.

Thereafter, the occupant detecting unit 22 may determine whether there is an occupant who is wearing a medical device such as a pacemaker inside the vehicle 1 based on the occupant data supplied from the occupant data generating unit 21 (step S104). If there is no occupant who is wearing a medical device ("N" in step S104), this process may end.

In step S104, if there is an occupant who is wearing a medical device ("Y" in step S104), the occupant detecting unit 22 may determine the position of the occupant who is wearing a medical device (step S105). For example, the occupant detecting unit 22 may detect an occupant or occupants in any one or more of the seats of the vehicle 1 based on the images taken by the camera 12 and the detection result of the occupant position sensor 13. The occupant detecting unit 22 may determine the position of the occupant who is wearing a medical device based on the occupant data supplied from the occupant data generating unit 21. For example, the position of the occupant in a front seat of the vehicle 1 may be restricted to some extent due to activation of an airbag upon contact. This makes it possible for the occupant detecting unit 22 to estimate the position of the occupant in the front seat with high accuracy based on the detection result of the occupant position sensor 13. Additionally, it is possible for the occupant detecting unit 22 to estimate the position of the occupant in the front seat based on the images taken by the camera 12.

Figure 3:
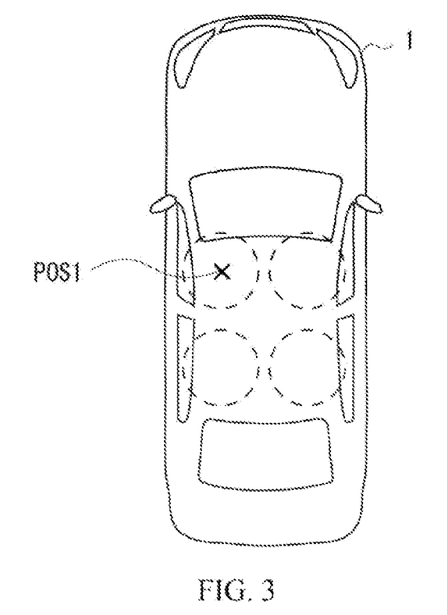
FIG. 3 is an explanatory diagram illustrating an example operation of an occupant detecting unit illustrated in FIG. 1.

FIG. 3 illustrates an example of the position of the occupant who is wearing a medical device detected by the occupant detecting unit 22. In this example, the occupant who is wearing a medical device may be seated in a front left seat among four seats of the vehicle 1. In this example, a position POS1 of the occupant who is wearing a medical device detected by the occupant detecting unit 22 may be located at the front left seat of the vehicle 1.

Thereafter, the electromagnetic wave sensor 14 detects an electromagnetic wave (step S106). The electromagnetic wave detecting unit 23 may determine the position of the source of the electromagnetic wave based on the detection result of the electromagnetic wave sensor 14 (step S107). For example, the electromagnetic wave detecting unit 23 may determine the position of the source of the electromagnetic wave based on intensities of electromagnetic waves detected by sensors included in the electromagnetic wave sensor 14 and disposed at various positions of the vehicle 1.

Figure 4:
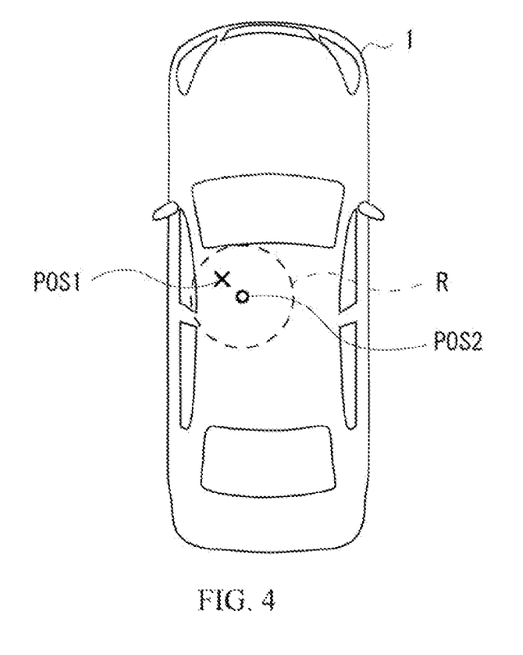
FIG. 4 is an explanatory diagram illustrating an example operation of an electromagnetic wave detecting unit illustrated in FIG. 1.

FIG. 4 illustrates an example of the position of the source of the electromagnetic wave detected by the electromagnetic wave detecting unit 23. In this example, a position POS2 of the source of the electromagnetic wave detected by the electromagnetic wave detecting unit 23 may be at the front left seat of the vehicle 1.

Thereafter, the source controlling unit 24 may determine whether the occupant who is wearing a medical device is within a predetermined range including the position of the source of the electromagnetic wave (step S108). In the example illustrated in FIG. 4, the position POS1 of the occupant who is wearing a medical device may be within a predetermined range R including the position of the source of the electromagnetic wave. In this example, the predetermined range R may be a circular region with its center at the position of the source of the electromagnetic wave.

In step S108, if the occupant who is wearing a medical device is within the predetermined range R including the position of the source of the electromagnetic wave ("Y" in step S108), the source controlling unit 24 may stop the operation of the source of the electromagnetic wave (step S109). For example, if the source of the electromagnetic wave is the motor 31, the source controlling unit 24 may control the operation of the motor 31 to cause the motor 31 to stop the operation. Furthermore, for example, if the source of the electromagnetic wave is the battery 32, the source controlling unit 24 may control the battery 32 to prevent the battery 32 from being charged or discharged. Furthermore, for example, if the source of the electromagnetic wave is the smart key system 33, the source controlling unit 24 may control the operation of the smart key system 33 to cause the smart key system 33 to stop the operation. This makes it possible for the source controlling unit 24 to prevent the source of the electromagnetic wave from generating the electromagnetic wave. That is, in this case, the occupant who is wearing a medical device may be located close to the source of the electromagnetic wave, which may possibly cause the medical device to erroneously operate. Given the situation, the source controlling unit 24 may stop the operation of the source of the electromagnetic wave to make the source hardly generate the electromagnetic wave.

In step S108, if the occupant who is wearing a medical device is not within the predetermined range R including the position of the source of the electromagnetic wave ("N" in step S108), the source controlling unit 24 may limit the operation of the source of the electromagnetic wave (step S110). For example, if the source of the electromagnetic wave is the motor 31, the source controlling unit 24 may control the operation of the motor 31 to decrease a rotating speed of the motor 31. Furthermore, for example, if the source of the electromagnetic wave is the battery 32, the source controlling unit 24 may limit the operation of the battery 32 to limit a charging and discharging amount of the battery 32. Furthermore, for example, if the source of the electromagnetic wave is the smart key system 33, the source controlling unit 24 may control the operation of the smart key system 33 to cause the smart key system 33 to reduce a transmission electric power. This makes it possible for the source controlling unit 24 to reduce the intensity of the electromagnetic wave generated by the source of the electromagnetic wave while maintaining operations of the vehicle 1 to some extent. That is, in this case, although the occupant who is wearing a medical device is slightly away from the source of the electromagnetic wave, there is a possibility of erroneous operation of the medical device due to the electromagnetic wave. For this reason, the source controlling unit 24 may limit the operation of the source of the electromagnetic wave to reduce the intensity of the electromagnetic wave generated by the source.

Thereafter, the electromagnetic wave sensor 14 detects an electromagnetic wave (step S111). That is, because the intensity of the electromagnetic wave generated by the source of the electromagnetic wave in the vehicle 1 is reduced in steps S109 and S110, the electromagnetic wave sensor 14 may detect an electromagnetic wave from the outside of the vehicle 1 in step S111.

Thereafter, the electromagnetic wave detecting unit 23 may determine whether the intensity of the electromagnetic wave is greater than or equal to a predetermined level based on the detection result of the electromagnetic wave sensor 14 (step S112). If the intensity of the electromagnetic wave is not greater than or equal to the predetermined level ("N" in step S112), the flow may proceed to step S114.

Figure 5:
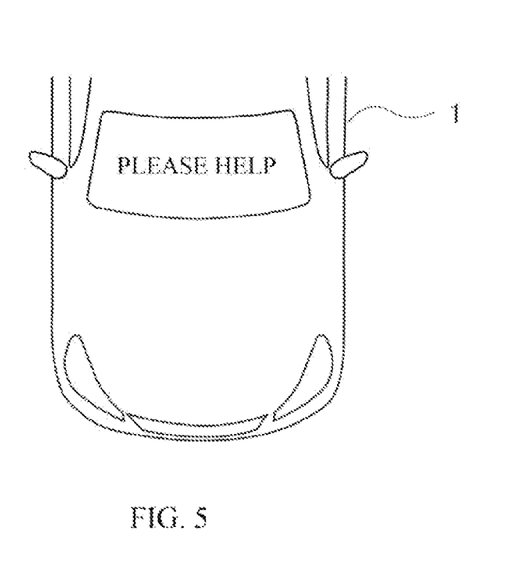
FIG. 5 is an explanatory diagram illustrating an example operation of a notification controlling unit illustrated in FIG. 1.
Figure 6:
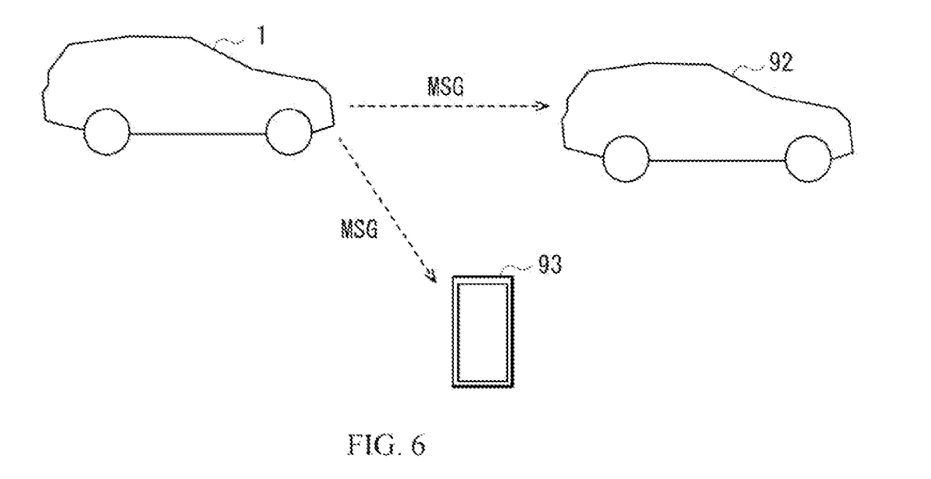
FIG. 6 is another explanatory diagram illustrating an example operation of the notification controlling unit illustrated in FIG. 1.

In step S112, if the intensity of the electromagnetic wave is greater than or equal to the predetermined level ("Y" in step S112), the vehicle 1 may make a rescue notification (step S113). For example, the notification controlling unit 26 may control the operation of the lamp 41 or the horn 42 to cause the lamp 41 to emit light or the horn 42 to emit a sound. In this manner, the vehicle 1 may notify people around the vehicle 1 that there is an occupant to be rescued inside the vehicle 1. Furthermore, as illustrated in FIG. 5, the notification controlling unit 26 may control the operation of the head-up display 43 to cause the head-up display 43 to display a message indicating that there is an occupant to be rescued inside the vehicle 1 on the front windshield, the rear window, the side window, etc. in such a manner that the message is visible from the outside of the vehicle 1. Furthermore, as illustrated in FIG. 6, the notification controlling unit 26 may control the operation of the communicator 15 to cause the communicator 15 to transmit a message (a rescue message MSG) indicating that there is an occupant to be rescued inside the vehicle 1 to the vehicle 92 around the vehicle 1 and the portable terminal 93 held by a person around the vehicle 1. The rescue message MSG may include a fact that there is an occupant who is wearing a medical device in the vehicle 1 or a rescue request that asks people around the vehicle 1 to rescue the occupant.

Thereafter, the occupant detecting unit 22 may determine whether the occupant who is wearing a medical device has been rescued to the outside of the vehicle 1 based on, for example, the images taken by the camera 12 or the detection result of the occupant position sensor 13 (step S114). For example, the occupant detecting unit 22 may determine whether the occupant who is wearing a medical device has been rescued to the outside of the vehicle 1 based on, for example, the images taken by the camera 12 and the detection result of the occupant position sensor 13. Note that this example is a non-limiting example. Alternatively, the occupant detecting unit 22 may determine whether the occupant who is wearing a medical device has been rescued to the outside of the vehicle 1 based on, for example, a detection result of a non-illustrated door sensor. The occupant detecting unit 22 may repeat the operation of step S114 until the occupant who is wearing a medical device is rescued to the outside of the vehicle 1.

Figure 7:
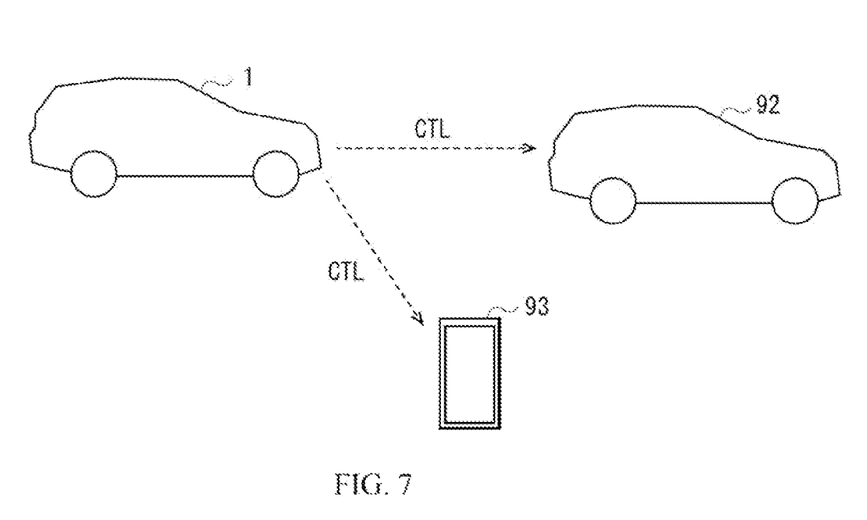
FIG. 7 is an explanatory diagram illustrating an example operation of an external device controlling unit illustrated in FIG. 1.

In step S114, if the occupant who is wearing a medical device has been rescued to the outside of the vehicle 1 ("Y" in step S114), the external device controlling unit 27 may limit the operation of the source of the electromagnetic wave outside the vehicle 1 (step S115). For example, as illustrated in FIG. 7, the external device controlling unit 27 may control the operation of the communicator 15 to cause the communicator 15 to transmit a control signal (a control signal CTL) to the vehicle 92 around the vehicle 1 or the portable terminal 93 of a person around the vehicle 1. The control signal may cause the output of the electromagnetic wave to be reduced or stopped. In a case where the vehicle 1 comes into contact with another vehicle, the vehicle 92 may be the other vehicle to which the vehicle 1 has come into contact. This makes it possible to reduce the possibility of erroneous operation of the medical device of the occupant who is rescued to the outside of the vehicle 1 due to the electromagnetic wave.

This may be the end of this flow.

Note that in this example, when the occupant who is wearing a medical device is rescued to the outside of the vehicle 1 in step S114, the external device controlling unit 27 may limit the operation of the source of the electromagnetic wave outside the vehicle 1 in step S115. However, this example is a non-limiting example. In some embodiments, if the intensity of the electromagnetic wave is greater than or equal to the predetermined level in step S112, the external device controlling unit 27 may limit the operation of the source of the electromagnetic wave outside the vehicle 1.

As described above, the occupant protection apparatus 10 includes the contact sensor 11, the occupant detecting unit 22, the electromagnetic wave sensor 14, the source controlling unit 24, and the protection processing unit 25. The contact sensor 11 is configured to detect contact of the vehicle 1. The occupant detecting unit 22 is configured to detect whether there is an occupant who is wearing a medical device in the vehicle 1 if the contact sensor 11 detects contact of the vehicle. The electromagnetic wave sensor 14 is configured to detect an electromagnetic wave. The source controlling unit 24 is configured to control the vehicle 1 to reduce the electromagnetic wave inside the vehicle 1 based on the detection result of the electromagnetic wave sensor 14. The protection processing unit 25 is configured to perform a protection process of protecting the occupant who is wearing a medical device based on the detection result of the electromagnetic wave sensor 14 after the source controlling unit 24 has controlled the vehicle 1. This makes it possible for the occupant protection apparatus 10 to appropriately protect the occupant who is wearing a medical device before, for example, the police or the fire department arrives in response to the emergency notification.

In the occupant protection apparatus 10, as illustrated in step S113, the protection process may include controlling the communicator 15 that is communicable with devices, such as the vehicle 92 and the portable terminal 93, around the vehicle 1 to cause the communicator 15 to notify the devices that there is an occupant who is wearing a medical device in the vehicle 1. This may allow the people around the vehicle 1 to be aware that there is an occupant who is wearing a medical device asking for a rescue inside the vehicle 1, making it possible for them to rescue the occupant from the vehicle 1. Thus, it is possible for the occupant protection apparatus 10 to appropriately protect the occupant who is wearing a medical device.

In the occupant protection apparatus 10, as indicated in step S113, the protection process may include controlling the communicator 15 that is communicable with devices, such as the vehicle 92 and the portable terminal 93, around the vehicle 1 to cause the communicator 15 to notify the devices of the rescue request. This may allow the people around the vehicle 1 to be aware that there is an occupant asking for a rescue inside the vehicle 1, making it possible for them to rescue the occupant from the vehicle 1. Thus, it is possible for the occupant protection apparatus 10 to appropriately protect the occupant who is wearing a medical device.

In the occupant protection apparatus 10, as illustrated in step S113, the protection process may include controlling the operation of the notifier such as the lamp 41, the horn 42, or the head-up display 43. It is possible for the notifier to make a notification of information by one or both of a visual method and an auditory method. In this manner, the vehicle 1 may notify people around the vehicle 1 that there is an occupant to be rescued inside the vehicle 1. This makes it possible for the people around the vehicle 1 to rescue the occupant. Thus, it is possible for the occupant protection apparatus 10 to appropriately protect the occupant who is wearing a medical device.

In the occupant protection apparatus 10, as indicated in step S115, the protection process may include controlling the operation of the communicator 15 that is communicable with devices, such as the vehicle 92 and the portable terminal 93, around the vehicle 1 to cause the communicator 15 to transmit the control signal CTL. The control signal CTL may instruct to reduce or stop the electromagnetic wave to be outputted from the devices around the vehicle 1. This makes it possible to reduce, for example, the possibility of erroneous operation of the medical device of the occupant who is rescued to the outside of the vehicle 1 due to the electromagnetic wave. Thus, it is possible for the occupant protection apparatus 10 to appropriately protect the occupant who is wearing a medical device.

According to the foregoing example embodiment, the contact sensor, the occupant detector, the electromagnetic wave sensor, the control processor, and the protection processor are included. The contact sensor is configured to detect contact of the vehicle. The occupant detector is configured to detect whether there is an occupant who is wearing a medical device in the vehicle when the contact sensor detects the contact of the vehicle. The electromagnetic wave sensor is configured to detect an electromagnetic wave. The control processor is configured to control the vehicle to reduce the electromagnetic wave inside the vehicle based on the detection result of the electromagnetic wave sensor. The protection processor is configured to perform the protection process of protecting the occupant who is wearing a medical device, based on the detection result of the electromagnetic wave sensor after the control processor has controlled the vehicle. This helps to appropriately protect the occupant who is wearing a medical device.

In some embodiments, the protection process may include controlling the operation of the communicator that is communicable with devices around the vehicle to cause the communicator to notify the devices that there is the occupant who is wearing a medical device in the vehicle. This helps to appropriately protect the occupant who is wearing a medical device.

In some embodiments, the protection process may include controlling the operation of the communicator that is communicable with devices around the vehicle to cause the communicator to notify the devices of the rescue request. This helps to appropriately protect the occupant who is wearing a medical device.

In some embodiments, the protection process may include controlling the operation of the notifier that is configured to make a notification of information by one or both of a visual method and an auditory method. This helps to appropriately protect the occupant who is wearing a medical device.

In some embodiments, the protection process may include controlling the operation of the communicator that is communicable with devices around the vehicle to cause the communicator to transmit a control signal instructing to reduce or stop an electromagnetic wave to be outputted from the devices around the vehicle. This helps to appropriately protect the occupant who is wearing a medical device.

In the above-described example embodiment, although the occupant data generating unit 21 may be configured to generate occupant data and store the generated occupant data, this example is a non-limiting example. In some embodiments, an information processing apparatus such as a server located outside the vehicle 1 may generate the occupant data and store the generated occupant data. In this case, the occupant detecting unit 22 may obtain the occupant data from the information processing apparatus if the vehicle 1 comes into contact with an object.

In the above-described example embodiment, the camera 12 may be provided; however, this example is a non-limiting example. In some embodiments, the camera 12 may be omitted. In this case, the occupant data generating unit 21 may be configured to generate the occupant data based on, for example, data for identifying the occupant obtained through communication between the communicator 15 and the portable terminal of the occupant. In this case, the occupant data may include data for identifying the occupant and data indicating whether the occupant is wearing a medical device such as a pacemaker. In this case, the occupant detecting unit 22 may be configured to detect an occupant or occupants seated in any one or more of the seats of the vehicle 1 based on the communication result of the communicator 15 and the detection result of the occupant position sensor 13 and to determine the position of the occupant who is wearing a medical device such as a pacemaker based on the occupant data supplied from the occupant data generating unit 21. For example, the occupant detecting unit 22 may be configured to determine in which of the seats the occupant who is wearing a medical device is seated based on the intensity of a signal received by the communicator 15. The signal may be transmitted from the portable terminal of the occupant who is wearing a medical device.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, although the motor 31, the battery 32, and the smart key system 33 may be the source of the electromagnetic wave, these examples are non-limiting examples, and other components may be the source of the electromagnetic wave. For example, in a gasoline-powered vehicle, the engine may be the source of the electromagnetic wave.

The occupant protection apparatus according to at least one embodiment of the disclosure makes it possible to improve the safety of the occupant who is wearing a medical device.

As used herein, the term "collision" may be used interchangeably with the term "contact".

One or both of the source controlling unit 24 and the protection processing unit 25 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the source controlling unit 24 and the protection processing unit 25 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the source controlling unit 24 and the protection processing unit 25 illustrated in FIG. 1.

The invention claimed is:

1. An occupant protection apparatus to be applied to a vehicle, the occupant protection apparatus comprising:
   a contact sensor configured to detect contact of the vehicle;

an occupant processor configured to detect whether there is an occupant who is wearing a medical device in the vehicle when the contact sensor detects the contact of the vehicle;

an electromagnetic wave sensor configured to detect an electromagnetic wave;

a control processor configured to control the vehicle to reduce the electromagnetic wave inside the vehicle based on a first detection result of the electromagnetic wave sensor, the first detection result being a detection result of the electromagnetic wave sensor in response to (i) a detection of the contact of the vehicle by the contact sensor and (ii) a detection of the occupant who is wearing the medical device in the vehicle by the occupant processor, the electromagnetic wave inside the vehicle being reduced by the control processor based on a position of the occupant who is wearing the medical device in the vehicle and a position of a source of the electromagnetic wave detected inside the vehicle; and a protection processor configured to perform a protection process of protecting the occupant who is wearing the medical device, based on a second detection result, the second detection result being a detection result of the electromagnetic wave sensor in response to an execution of the control of the vehicle to reduce the electromagnetic wave inside the vehicle, wherein the protection process comprises controlling operation of a communicator of the vehicle to notify a device around the vehicle that there is the occupant who is wearing the medical device in the vehicle, the communicator being communicable with the device around the vehicle.

2. The occupant protection apparatus according to claim 1, wherein the protection process comprises controlling the operation of the communicator to cause the communicator to notify a user of the device around the vehicle of a rescue request, the communicator being communicable with the device around the vehicle.

3. The occupant protection apparatus according to claim 1, wherein the protection process comprises controlling operation of a notifier that is configured to make a notification of information by one or both of a visual method and an auditory method such that the notification is visible or audible or both from an outside of the vehicle.

4. The occupant protection apparatus according to claim 1, wherein the protection process comprises controlling the operation of the communicator to cause the communicator to transmit a control signal instructing to reduce or stop an electromagnetic wave to be outputted from the device around the vehicle.

5. The occupant protection apparatus according to claim 1, wherein the control processor is configured to stop operation of the source of the electromagnetic wave detected inside the vehicle in response to the position of the occupant who is wearing the medical device being within a predetermined range from the position of the source of the electromagnetic wave detected inside the vehicle.

6. The occupant protection apparatus according to claim 5, wherein the control processor is configured to limit operation of the source of the electromagnetic wave detected inside the vehicle in response to the position of the occupant who is wearing the medical device not being within a predetermined range from the position of the source of the electromagnetic wave detected inside the vehicle.

7. The occupant protection apparatus according to claim 6, wherein the second detection result indicates an intensity of the electromagnetic wave, wherein the protection processor configured to perform the controlling the operation of the communicator to notify the device around the vehicle that there is the occupant who is wearing the medical device in the vehicle when the intensity of the electromagnetic wave is greater than or equal to a predetermined level.

8. The occupant protection apparatus according to claim 7, wherein the protection process comprises controlling the operation of the communicator to cause the communicator to transmit a control signal instructing to reduce or stop an electromagnetic wave to be outputted from the device around the vehicle.

9. The occupant protection apparatus according to claim 1, wherein the control processor is configured to limit operation of the source of the electromagnetic wave detected inside the vehicle in response to the position of the occupant who is wearing the medical device not being within a predetermined range from the position of the source of the electromagnetic wave detected inside the vehicle.

* * * * *